(12) United States Patent
Estrin et al.

(10) Patent No.: US 6,884,486 B2
(45) Date of Patent: Apr. 26, 2005

(54) STRUCTURE COMPOSED OF ELEMENTS AND METHOD FOR ITS PRODUCTION

(75) Inventors: Juri Estrin, Goslar (DE); Norbert Müller, Goslar (DE); Detlef Trenke, Clausthal-Zellerfeld (DE); Arcady Dyskin, Karrinyup (AU); Elena Pasternak, Karrinyup (AU)

(73) Assignee: Technische Universitat Clausthal, Clausthal-Zellerfeld (DE)

( * ) Notice: Subject to any disclaimer, the term of this patent is extended or adjusted under 35 U.S.C. 154(b) by 0 days.

(21) Appl. No.: 10/446,137

(22) Filed: May 28, 2003

(65) Prior Publication Data
US 2003/0228432 A1 Dec. 11, 2003

(30) Foreign Application Priority Data
May 29, 2002 (DE) .......................... 102 23 796

(51) Int. Cl.⁷ .......................... B32B 3/02; B29C 35/08; H05B 6/00
(52) U.S. Cl. .......................... 428/45; 428/116; 428/172; 428/178; 428/179; 156/89.11; 156/89.22; 264/497
(58) Field of Search .......................... 428/33, 45, 52, 428/53, 57, 58, 64.1, 116, 178, 179, 188, 172; 156/89.11, 89.22; 264/401, 482, 497

(56) References Cited
U.S. PATENT DOCUMENTS
5,738,924 A * 4/1998 Sing .......................... 428/68

OTHER PUBLICATIONS

Arcady Dyskin, et al., "Toughening by Fragmentation—How Topology Helps", Advanced Engineering Materials, 2001, vol. 3, No. 11, pp. 885–888.

* cited by examiner

Primary Examiner—Donald J. Loney
(74) Attorney, Agent, or Firm—McGuireWoods LLP

(57) ABSTRACT

The invention relates to a structure assembled from elements, the elements forming an entity with topological interlocking. To improve structures of this type, the invention proposes a self-supporting structure comprising hollow, tublar element (1), which are put together with parallel axes to form an interlocking entity without any binder as a composite layer, in which the element (1), respectively lying only loosely against one another with linear contact, are held together by a frame (2) or the like extending around the element structure and determining the flexural elesticity of the structure by its own restraining force, each of the elements (1) having a circular middle cross section (3) starting from the circumference of which the generated convex half-surfaces of the element (1), go over in a smoothly curved manner to the two element ends, the edge contour (4) of which repectively has the form of a flat ellipse having pointed major-axis vertices (5), the major axes (7, 8) of which, lying normal to the longitudinal axis (6) of the element, are turned by 90° with respect to each other about the longitudinal axis (6) of the element, the axial ratio of the two ellipse axes (7, 8) in a cross section lying normal to the longitudinal axis (6) of the element increasing continuously from the center of the element (1) respectively to its ends.

19 Claims, 5 Drawing Sheets

STRUCTURE COMPOSED OF ELEMENTS AND METHOD FOR ITS PRODUCTION

The invention relates to a structure composed of elements, the elements forming an entity with topological interlocking.

In the article "Toughening by Fragmentation—How Topology Helps" in Advanced Engineering Materials 2001, 3 No. 11, pages 885–888, the fundamentals of a topological self-interlocking entity are described.

The invention is based on the object of developing structures of this type which are self-supporting and comprise identical elements which are put together without connecting elements or binders and have a favorable surface-area/volume ratio. They are intended primarily to replace structures put together by means of a joining technique, which have weak points and/or undesired stress concentrations, for example when aggressive media are used.

This object is achieved according to the invention by a self-supporting structure comprising hollow, tubular elements, which are put together with parallel axes to form an interlocking entity without any binder as a composite layer, in which the elements, respectively lying only loosely against one another with linear contact, are held together by a frame or the like extending around the element structure and determining the flexural elasticity of the structure by its own restraining force, each of the elements having a circular middle cross section, starting from the circumfrence of which the generated convex half-surface of the elements go over in a smoothly curved manner to the two element ends, the edge contour of which respectively has the form of a flat ellipse having pointed major-axis vertices, the major axes of which, lying normal to the longitudinal axis of the element, are turned by 90° with respect to each other about the longitudinal axis of the element, the axial ratio of the two ellipse axes in a cross section lying normal to the longitudinal axis of the element increasing continuously from the center of the element respectively to its ends.

The invention is also based on the object of using a suitable method for producing the structures according to the invention.

This object is achieved by a method which is characterized according to the invention by a computational breakdown of the structure into a number of layers, by successive application of layers of metal or ceramic powder particles and by subsequent selective laser sintering.

This method operates on the principle of rapid tooling, which is understood as meaning the production of forms, in particular tools, by the methods of rapid prototyping (RP). Rapid prototyping as a generic term covers all the production method which make it possible to generate models from 3D CAD data. As distinct from conventional methods, in which the form is produce by removal of material, this objective is achieved in the case of most RP methods by the build-up of material layer by layer. A major feature of this is the direct conversion of 3D CAD design into material models. The rapid tooling process sequence is in this case made up of the following steps:

CAD design of the component preparation of the CAD data for the building process
building process
desired or required finishing operations.

After the design, the finished CAD data record must be prepared appropriately for machining. Work is then preferably based on the direct metal-laser sintering process, in which the energy of a laser initially melts the scanned regions of a planar metal powder bed (corresponding to the layer information concerning the component). The liquefied powder particles bond to one another as a result and solidify to form a solid structure.

By the method described above, an entire self-supporting structure can be produced according to the invention simultaneously from different materials, such as for example metals or ceramics, it being possible for the density of the material to be varied. It is consequently unnecessary to produce the hollow, tubular elements individually.

The method comprises quite generally the production of all structure based on interlocked elements, it being possible to use both individual elements and elements arranged on a substrate or grown on it. This includes the method in which such elements are applied layer by layer and the material is subsequently consolidated, with a computational breakdown of the self-supporting structure to be generated taking place. Alternative techniques for applying the elements or the material which comprises corresponding elements, such as for example metal or ceramic powder particles, are all the lithographic processes, the application of a gaseous or liquid phase, including a physical coating, for example by vapor deposition or sputtering, and also chemical vapor deposition (CVD), lamination with etching of suitable patterns, etc.

When the method described above is used for producing a all supporting structure according to the invention said structure is first broken down computationatly into a number of layers and then built up layer by layer by successive application of layers of powder particles (for example metal or ceramic powder) and subsequent laser sintering. In this case, it is most important that component parts of individual elements in each layer do not sinter to one another, so that each tubular element in the composed structure is not bonded with its neighbors but marely arrested geometrically by the neighboring elements.

In the case of the self-supporting structure built up according to the invention, it is not possible to remove an individual element from the composite layer on account of topoloqical interlocking. Since this would not apply to the elements arranged in an edge row of the structure, the frame extending around the element structure is provided according to the invention.

The individual elements may have different wall thicknesses, a thin-walled formation being advantageous for the creation of a large surface area with low mass. Moreover, the elements may have any desired configuration of their inner surface.

The structures according to the invention have a high flexural flexibility and are characterized by a large surface-area/mass ratio. With the aid of the production method explained above, a high porosity of the element walls can also be brought about in a specifically selective manner, whereby the surface area/mass ratio is increased still further and, if need be, a high permeability is achieved. In the case of the latter formation, at least some elements may be filled with an active substance.

Elements may consist of different materials. Furthermore, some elements may have a double length and consequently serve for anchoring structures lying one on top of the other.

In one possible embodiment, the frame may be rigidly formed and have a clamping device, which reduces the size of the interior space enclosed by the frame and receiving the elements. In principle, however, it is also possible for the frame to be elastically formed, its restraining force having to be adequate to ensure a certain flexural elasticity of the self-supporting structure.

With elements of different lengths, curved structures can also be formed.

Structures formed according to the invention can be used in particular in the construction and mechanical engineering sectors for controlled sound damping or insulation; these structures can, however, also be used with preference for catalysts, filters, chemical reactors or baffles.

An embodiment of the invention serving as an example is represented in the drawing, in which.

Figure 1:
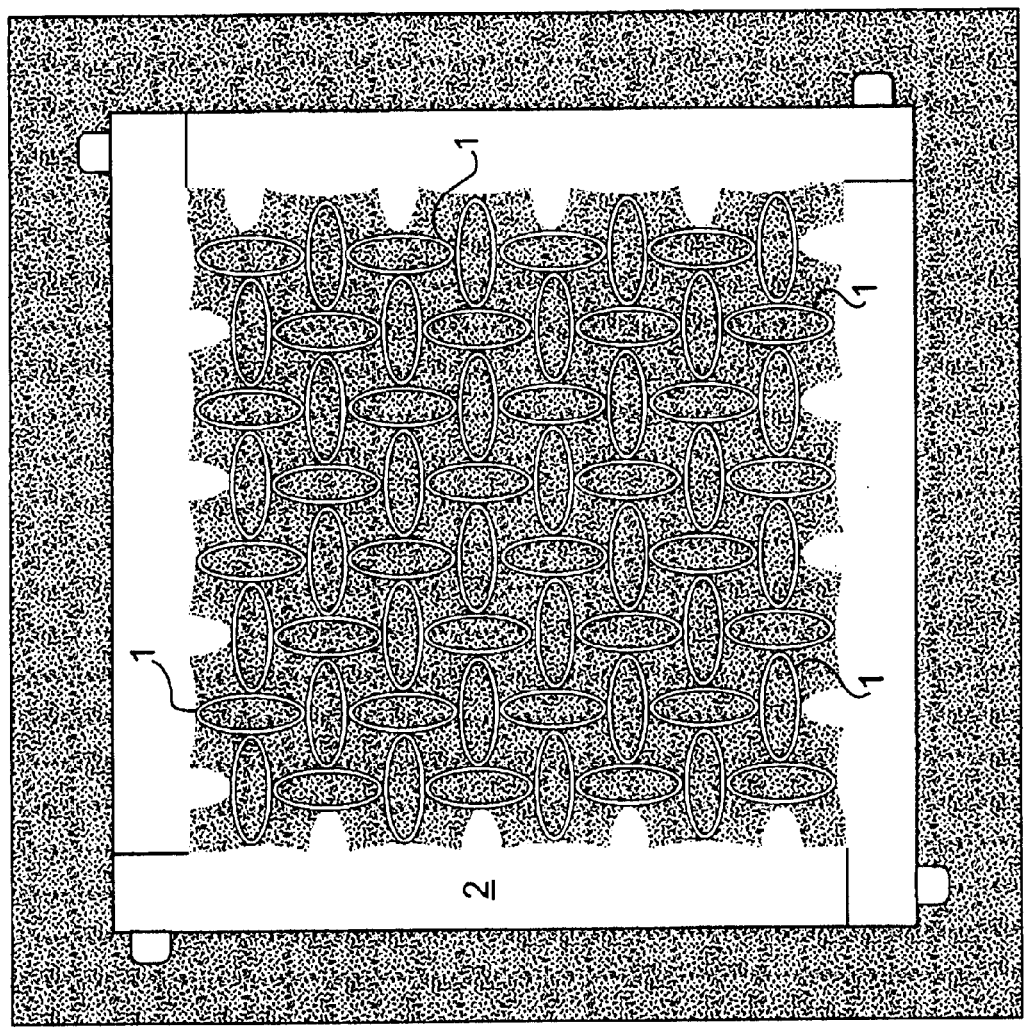
FIG. 1 shows a self-supporting structure comprising hollow, tubular elements enclosed by a rigid frame, in plan view.

FIG. 1 shows a self-supporting structure comprising hollow tubular elements 1 which are put together with parallel axes to form an interlocking entity without any binder as a composite layer, in which the elements 1, respectively lying only loosely against one another with linear contact, are held together by a frame 2 extending around the element structure and determining the flexural elasticity of the structure by its own restraining force.

Figure 2:
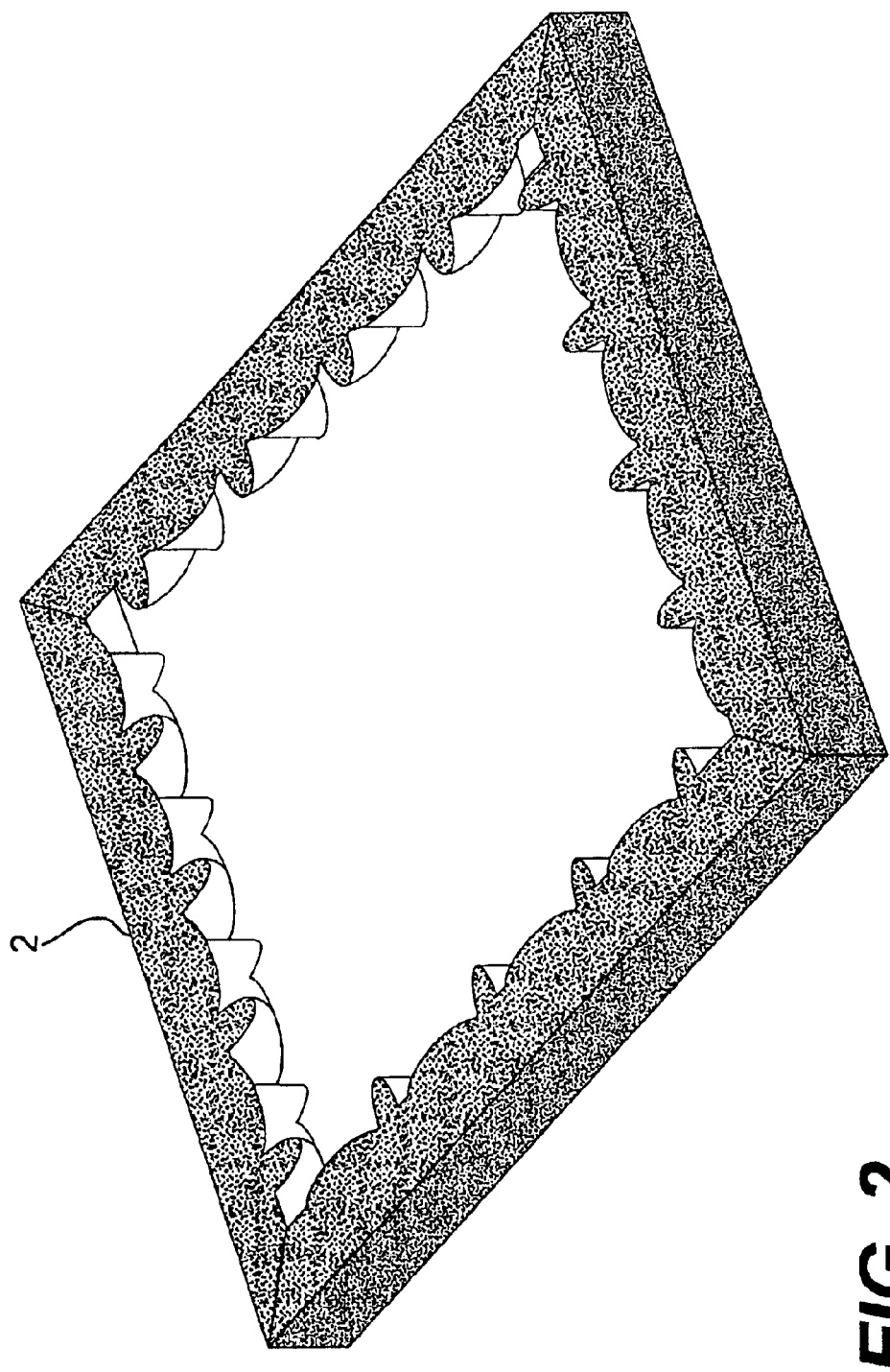
FIG. 2 shows the frame according to FIG. 1 in an isometric representation.

FIG. 2 shows the frame 2, the inner contour of which is adapted to the outer contour of the edge layers of the structure formed by the elements 1.

Figure 3:
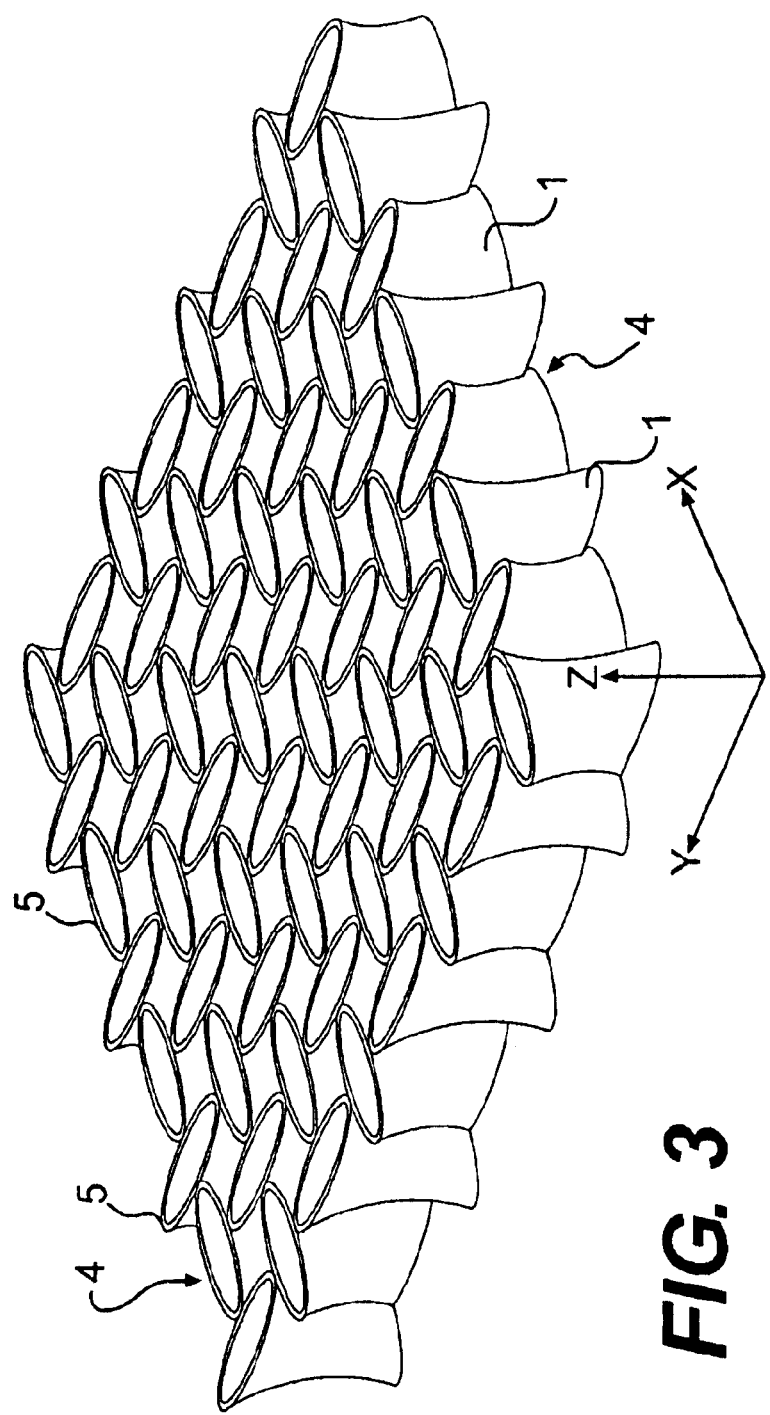
FIG. 3 shows the structure according to FIG. 1 in an isometric representation.
Figure 4:
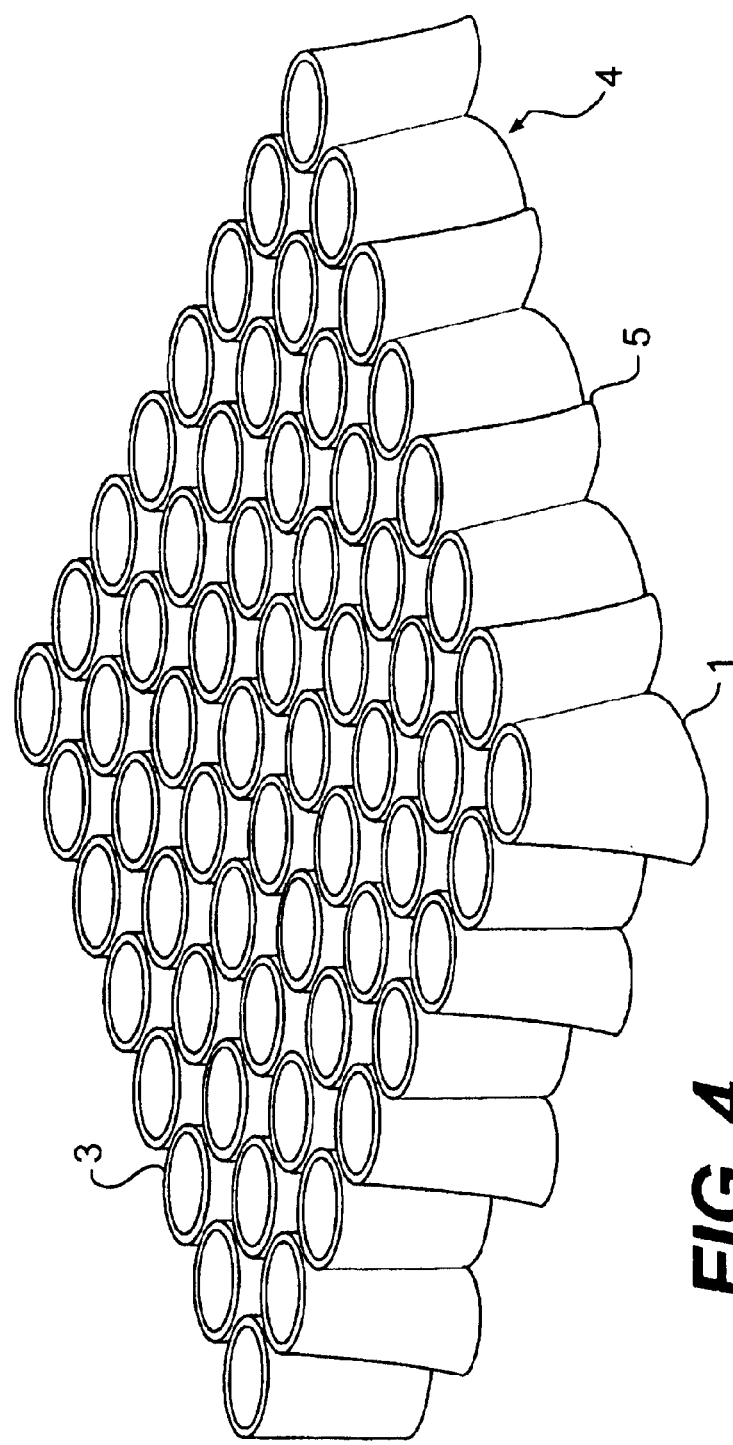
FIG. 4 show a middle cross section of the structure according to FIG. 3 in a representation according to FIG. 3
Figure 5:
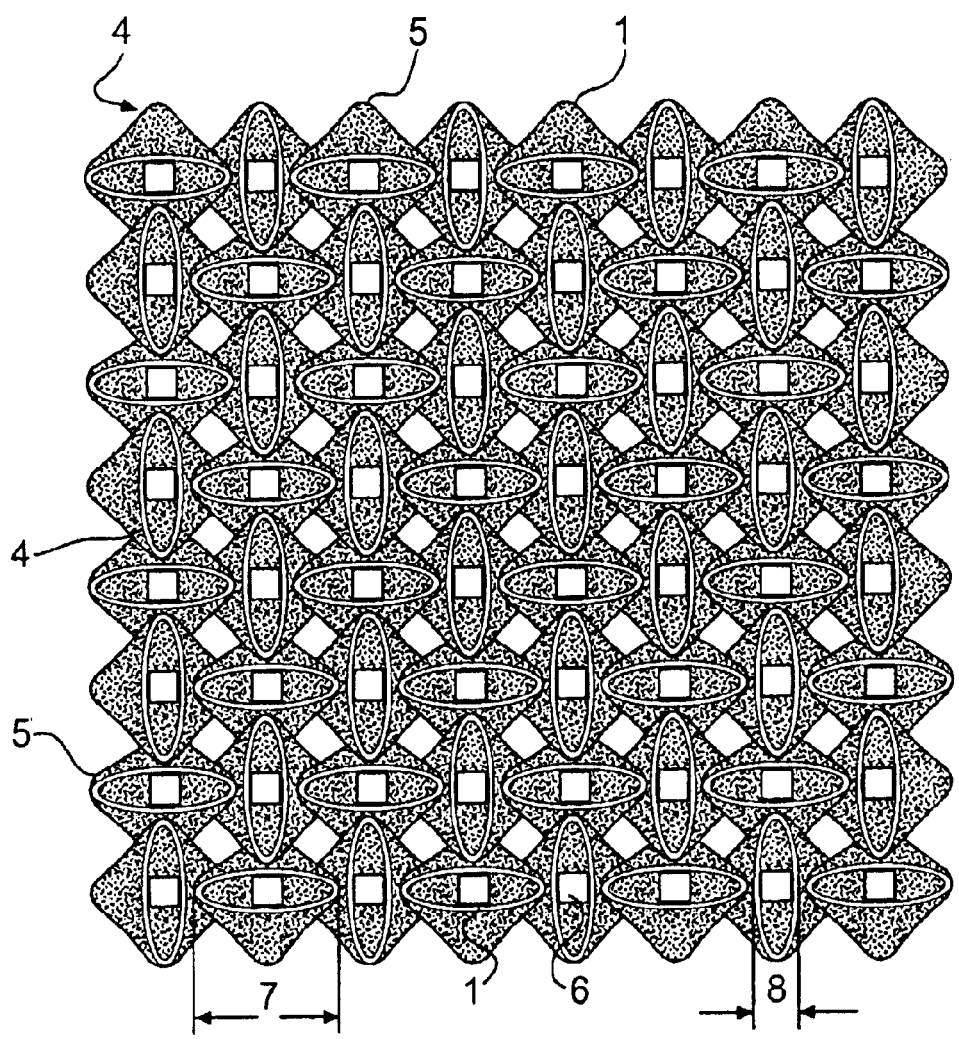
FIG. 5 shows the structure according to FIG. 3 in plan view.

FIGS. 3–5 reveal the form of the identically formed tubular elements 1. Each of the elements 1 accordingly has in central cross section a circular cross section 3 (see FIG. 4), starting from the circumference of which the generated surfaces of the element 1, having a circular middle cross section 3 (see FIG. 4), starting from the circumference of which the generated convex half-surfaces of the element 1, go over in a smoothly curved manner to the two element ends, the edge contour 4 of which respectively has the form of a flat ellipse having pointed major-axis vertices 5, the major axes 7, 0 of which, lying normal to the longitudinal axis 6 of the element, are turned by 90° with respect to each other about the lonqitudinal axis 6 of the element, the axial ratio of the two ellipse axes 7, 8 in a cross section lying normal to the longitudinal axis 6 of the element increasingly continuously from the center of the element 1 respectively to its ends.

What is claim is:

1. A self-supporting structure comprising hollow, tubular elements, which are put together with parallel axes to form an interlocking entity without any binder as a composite layer, in which the elements, respectively lying only loosely against one another with linear contact, are held together by a frame extending around the element structure and determining a flexural elasticity of the structure by its own restraining force, each of the elements having a circular middle cross section starting from the circumference of which generated convex half-surfaces of the element go over in an smoothly curved manner to element ends, the edge contour of which respectively has the form of a flat ellipse having pointed major-axis vertices, the major axes of which, lying normal to the longitudinal axis of the element, are turned by 90° with respect to each other about the longitudinal axis of the element, the axial ratio of the two ellipse axes in a cross section lying normal to the longitudinal axis of the element increasing continuously from the center of the element respectively to its ends.

2. The self-supporting structure according to claim 1, further comprising different wall thicknesses of the individual elements.

3. The self-supporting structure according to claim 1, further comprising a thin-walled formation of the elements for the creation of a large surface area with low mass.

4. The self-supporting structure according to claim 1, wherein the elements consist of different materials.

5. The self-supporting structure according to claim 1, wherein at east some elements are filled with an active substance and consist of a material of high permeability.

6. The self-supporting structure according to claim 1, further comprising any desired configuration of an inner surface of the elements.

7. The self-supporting structure according to claim 1, wherein some elements have a double length and serve for anchoring structures lying one on top of the other.

8. The self-supporting structure according to claim 1, wherein the frame is rigidly formed and has a clamping device, which reduces the size of the interior space enclosed by the frame and receiving the elements.

9. The self-supporting structure according to one of claim 1, wherein the frame is elastically formed.

10. The self-supporting structure according to claim 1, further comprising elements of different lengths for forming curved structures.

11. A method for producing a self-supporting structure according to claim 1, comprising the steps of providing a computational breakdown of the structure into a number of layers, by successive application of layers of metal or ceramic powder particles and by subsequent selective laser sintering.

12. The self-supporting structure according to claim 1, wherein the frame is a removable frame.

13. A method of manufacturing self-supporting structures having interlocking hollow elements lying loosely against one another with linear contact and no binding material, comprising the steps of:

computational breakdown of the self-supporting structure into a number of layers;

building up the self-supporting structure layer by layer by successive application of layers by powder particles; and selective laser sintering of the hollow elements such that individual hollow elements in each layer do not sinter to a neighboring hollow element and are fixed geometrically by integration into the neighboring hollow elements.

14. The method according to claim 13, wherein the building step includes the application of metal or ceramic powder particles.

15. The method according to claim 13, wherein the building step includes lithographic processes.

16. The method according to claim 15, wherein the lithographic processes include the application of a gaseous or liquid phase including a physical coating.

17. The method according to claim 15, wherein the lithographic processes include vapor deposition or sputtering.

18. The method according to claim 13, further comprising etching of suitable patterns in the self-supporting structure.

19. The method according to claim 13, further comprising forming a frame about the self-supporting structure to reduce a size of an interior space of the self-supporting structure.

* * * * *

UNITED STATES PATENT AND TRADEMARK OFFICE
CERTIFICATE OF CORRECTION

PATENT NO. : 6,884,486 B2
DATED : April 26, 2005
INVENTOR(S) : J. Estrin et al.

It is certified that error appears in the above-identified patent and that said Letters Patent is hereby corrected as shown below:

<u>Title page,</u>
Item [57], ABSTRACT,
Line 6, "tublar element" should be -- tubular elements --.
Line 8, "element" should be -- elements --.
Line 13, after "(3)" insert -- , --.

Signed and Sealed this

Sixth Day of December, 2005

JON W. DUDAS
*Director of the United States Patent and Trademark Office*